3,474,252
MIRROR ARRANGEMENT LIGHT SOURCE AND PHOTOCELL LOCATED ON A COMMON AXIS
Ulf J. Jacobsen, Soborg, Denmark, assignor to Ejnar Jensen & Son I/S, Ronne, Denmark, a company
Filed Oct. 23, 1965, Ser. No. 504,042
Int. Cl. H01j 3/14
U.S. Cl. 250—216                                    10 Claims

ABSTRACT OF THE DISCLOSURE

An optical system for photoelectric control and detector apparatus comprising two identically oriented concave mirrors, a light source and a photoelectric cell, the sensitive part of the photoelectric cell and the light-emitting part of the light source both being placed on the common optical axis of the two concave mirrors, the foremost of these concave mirrors being partially aluminized, preferably semi-aluminized. Either the light source or the photoelectric cell is placed between the two mirrors, the other of these two elements being placed in front of the foremost mirror, that is the partially aluminized one.

---

Figure 1:
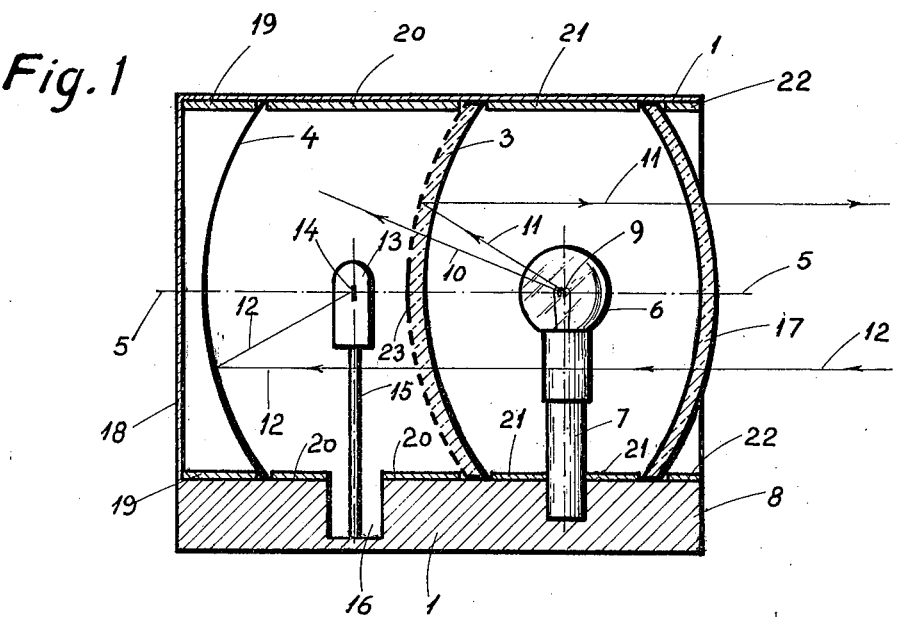

The present invention relates to an optical system comprising a light source and a photoelectric cell for use in photoelectric control or detector apparatuses and similar equipment, said system also containing a partially coated mirror such as a semi-silvered or semi-aluminized concave mirror.

It is a primary object of the invention to provide such an apparatus which will be simple and rugged, will give effective results with a comparatively weak light-source and which can therefore be built with small dimensions and has a high degree of optical efficiency.

Photoelectric control and detector devices are used for very many different purposes, such as for controlling the opening and closing of doors and windows, for activating or stopping escalators or elevators, and for many other purposes in daily life, but particularly in industry for semi or fully automatized machines of many different kinds, for example textile machinery, laundering machines to control their operation or the quality of the laundering, automatic or pleating machines, packing machines, wrapping machines, conveyors, valances and scales and other measuring apparatuses. In general, the light-source, sometimes via suitable optical members such as lenses, throws a bundle of light onto a reflector, from where the bundle is returned to the photoelectric cell, which responds thereto. The reflector, which constitutes no part of the present invention, may be a flat mirror, but more often one uses reflectors of the so-called pearl screen or prism reflex screen type, because of the difficulties in making perfectly exact flat mirrors and mounting them correctly. While travelling from the source of light in the system to the reflector and back to the photoelectric cell, the beam of light may meet with obstructions, which is then responded to by the photoelectric cell so that it energizes or de-energizes some electric circuit thereby for instance starting or stopping some mechanism controlled by the said circuit. Such circuits constitute no part of the present invention.

Various systems of the general type mentioned are already known. For instance a known optical system comprises an incandescent lamp the filament of which is placed in the focus of a convex lens, whereby the filament emits a beam of rays which are parallel after having passed the lens. The beam of rays hits a semi-aluminized or semi-silvered flat mirror which is placed at an angle of 45° to the direction of the beam of parallel rays, whereby the mirror reflects light (half of the incident rays) towards a reflector; between the flat mirror and the reflector a convex lens is usually placed so that the rays at least to some degree are converged toward the reflector. The reflector reflects the light back toward the optical system, and half of the returned rays pass through the system while half of the returned rays pass through the semi-aluminized flat mirror. Behind the latter the light which has passed therethrough is focused by passing through a convex lens, the sensitive part of the photoelectric cell being placed in the focus of said lens which is situated farthest away from the flat, oblique, semi-aluminized mirror. The arrangement has the disadvantage that the system as a unit has a rather complicated shape owing to the fact that the lamp is placed laterally with respect to the axis between the photoelectric cell and the reflector. It has also the disadvantage that it is difficult to manufacture and to mount a flat mirror accurately, and particularly the disadvantage that the system cannot in practice function with a relatively large aperture of the lenses. In order to obtain a large aperture in this known device it would be necessary to use corrected lens systems, which would increase the cost beyond acceptable limits. The resulting small aperture gives a comparatively low power or utilization of the light, and it is therefore necessary to employ a comparatively strong source of light, in practice most often an incandescent lamp of 15 watts. Such a lamp, however, evolves considerable heat, and since reasonably sensitive photoelectric cells cannot stand temperatures above about 70° C., this fact limits the compactness of the system. This is inconvenient because such systems are often to be mounted in places with a very small available space.

In another known system of the type in question the light-source or lamp is placed in the focal point of a concave mirror which reflects a beam of parallel rays onto the reflector. Between the latter and the lamp a convex lens is mounted, and in the focal point of this lens farthest away from the reflector a photoelectric cell is mounted. This system is not very suitable for use in connection with reflectors of the pearl screen or prism-screen type, but optically correct for use with flat mirrors. As mentioned, however, flat mirrors are difficult to manufacture and particularly to mount perfectly correct, and apart from this the said system also has the disadvantage of having a small aperture and hence low power. This is because the photoelectric cell, the lamp and the lens are placed between the concave mirror and the reflector, for which reason the beam of rays impinging on the reflector actually is ring-shaped; for this reason the amount of light reflected from the reflector and hitting the lens will be rather small. This is especially true because it is necessary to use a comparatively small lens, in practice one having an area of 1/20 of the mirror, in order to avoid an excessively large focal length. If the focal length is large, the length of the total system will also become large, which is undesirable. The amount of light to be utilized by the photoelectric cell will therefore be very small, for which reason the lamp must be comparatively strong. This system also has the disadvantage of a small lens aperture.

It is a main object of the invention to avoid the drawbacks set forth above and to provide an optical system of the kind stated which has a compact construction without the risk of excessive heating thereof. It is furthermore an object of the invention to provide such aggregate which is mechanically and optically simple and efficient. According to the invention, these and other objects, to be described hereinafter, are achieved by providing an optical system comprising two concave mirrors mounted with identical orientation, the front mirror of these being partially, preferably half, silvered or aluminized and the rearmost being substantially totally reflective, the mounting of the system being such that a straight line between the filament of the light source and the sensitive part of the photoelectric cell is identical with the common optical axis of the two concave mirrors. The use of concave mirrors allows a larger aperture than is possible with lenses and in many cases even with corrected lens systems, and thereby the optical system according to the invention acquires a larger aperture or higher optical power than the known ones. This again permits the use of a weaker lamp than is possible in known devices. In practice, incandescent lamps of this power are commonly available, but actually weaker lamps might be used. The weaker lamp permits a very compact construction of the aggregate without any risk that the development of heat in the housing in which the various components are mounted becomes so great as to damage the photoelectric cell. The mounting of the mirrors, the lamp and the photoelectric cell on one common, straight-lined axis furthermore renders the mechanical construction as simple as possible and thereby the housing very inexpensive; and it is still not necessary to use a flat mirror as a reflector. Also, a flat mirror in the system itself is avoided and replaced with concave mirrors which are easier to mount with the required degree of exactitude.

One particular advantage resides in the fact that the two concave mirrors, if desired, may be identical, except that one is partially and the other totally aluminized or silvered. In a preferred embodiment the two concave mirrors therefore have identical diameters and identical radii on their surfaces. This renders the manufacture of the mirrors particularly inexpensive and also simplifies the construction of the housing.

The placing of the photoelectric cell and the lamp relative to the mirror may vary. It is very expedient and simple to place the lamp in front of the foremost, semi-aluminized concave mirror, in or a little outside (farther away from the mirror) its focal point and the sensitive part of the photoelectric cell in the focal point of the rearmost, totally reflective concave mirror. Therefore, a simple construction of the entire system is obtained which is satisfactory for most purposes and has a high optical efficiency.

For certain very demanding purposes, for example, in laundering machines or folding machines for laundry, it may be expedient to modify this embodiment a little. In such machines the system is usually vertically mounted with the reflector placed above the system, and the machines are usually placed in very bright or strongly illuminated rooms. Therefore, large amounts of diffuse light from the surroundings penetrate into the system, some of it even into the space between the two concave mirrors. This makes heavy demands on the sensitivity of the photoelectrical cell, especially because some light also passes directly from the lamp through the semi-aluminized concave mirror into the said space so that rays which pass its central part may hit the fully aluminized concave mirror and be reflected onto the photoelectric cell. To avoid this portion of the reflected light and thereby reduce the demands on the sensitivity of the photoelectric cell, it is preferred in systems for very demanding purposes to have a central part of the semi-aluminized concave mirror fully aluminized or blocked by non-reflecting material. Such masking or blocking is not normally required in systems for less demanding purposes.

If a particularly compact construction of the system is desired, both the lamp and the photoelectric cell may be placed in front of the semi-aluminized mirror, in which case the latter has a central opening through which the rays from the totally reflecting concave mirror may reach the photoelectric cell placed in its focal point.

In some cases it is desirable to place the lamp so that it is obscured as much as possible so that it is invisible or scarcely visible from the front end of the system. In that case, it is possible to place the incandescent lamp with the filament near to or preferably at the focal point of the rear, totally aluminized concave mirror and the photoelectric cell with its sensitive part at the focal point of the front, semi-aluminized concave mirror. In that case the semi-aluminized mirror must be blocked, for example it may be totally aluminized, in a central part opposite the lamp, which may be placed immediately behind this mirror. If it is desired to combine this hidden position of the lamp with a very compact construction of the system, i.e. to have it as short as possible with the given dimensions of the concave mirrors, it is according to the invention particularly expedient to construct the system so that the source of light is placed in a central opening in the rear, totally aluminized concave mirror, whereas a substantially totally backwards reflecting mirror is mounted on the rear side of the front, semi-aluminized concave mirror, the sensitive part of the photoelectric cell being situated at the focal point of the semi-aluminized concave mirror. Therefore, it is possible to place the light-source, i.e. the filament, functionally at the focal point of the totally aluminized concave mirror, because the rays are reflected from the mirror turned rearward onto the fully aluminized concave mirror, which subsequently reflects the beam as parallel rays which partly penetrate through the unblocked peripheral parts of the semi-aluminized concave mirror, from where they hit the reflector and are reflected onto the semi-aluminized concave mirror, half part of them penetrating the latter and the other half being reflected onto the photoelectric cell placed in its focal point.

It is optically preferable to arrange the system in such manner that the rays inside the system only travel as parallel rays and rays that converge toward or diverge from the various focal points. In other words it is preferable to place the sensitive part of the photoelectric cell and the filament of the lamp at the actual or functional focal points of the respective concave mirrors. In some cases, especially if the reflector is to be placed at a small distance from the system, it may, however, be expedient to let the rays travelling out from the system converge somewhat, i.e. to place the filament a little more distant from the mirror than the focal point in question. With this arrangement, the smallest loss of light results when the rays from the lamp after having been reflected by the concave mirror in question are parallel as well as the rays returning to the other concave mirror.

On the other hand it is usually more expedient if the rays converge toward the reflector so that a sharp image of the filament is formed near or just at the distance from the system at which the reflector is situated. The latter is in most cases placed at a definite, invariable distance from the system. If a flat mirror is used for reflector, the rays incident to the reflector must be parallel, but when a pearl screen or a prism-screen constitutes the reflector, as is usually the case, the rays should preferably converge toward it. This is because the reflectors and screens of this kind have the property of reflecting the light in the same manner as it comes. If the incident rays are parallel they will be reflected as parallel rays. If they converge, they will be reflected diverging at the same angle of divergence as the angle of divergence of the incident light. In order to obtain rays which converge towards the reflector and yet are parallel inside the system, it is expedient according to the invention, in those cases in which the system is mounted in a housng with a cylindrical chamber containing the concave mirrors, the light source and the photoelectric cell, to arrange the mounting in such manner that the filament of the lamp actually or functionally is situated in the focal point of the concave mirror in question, whereby the housing is provided at its front end with a convex lens which focuses the parallel rays coming thereto from the lamp via the said concave mirror, said focusing preferably being at a point at or near the reflector co-operating with the system.

It is usually necessary to provide a cover-glass in the front end of the housing to prevent dust from penetrating into the housing. This cover glass usually cannot be made from flat glass because a flat cover glass would reflect too much light backwards towards the concave mirror. This inconvenience might be remedied by placing such a flat front cover in an oblique position, but this is mechanically inexpedient and would cause a some what complex construction of the housing and mounting of the system. The cover glass therefore should have curved surfaces. If the rays travelling from the light source via the concave mirror in question converge in a suitable degree toward a reflector which is placed comparatively far away, or are parallel, which has about the same optical effect when the reflector is distant, the cover glass may be optically neutral. If, on the other hand, the reflector is to be placed at a comparatively short distance from the system and the rays travel parallel to each other from the concave mirror, it is expedient to use a convex lens as front cover. The disadvantages with respect to the relative aperture in the known devices is unimportant in this connection, firstly because there is only one lens through which all light passes which emanates from the system and is returned thereto from the reflector; and secondly, because the lens may have a large diameter and, on account of the closely placed reflector, a comparatively small focal distance, i.e., a large relative aperture. It should be emphasized that the image of the filament of the lamp need not fall exactly on the reflector but merely near to it; it should also be noted that the cover glass may also be optically neutral when the rays are parallel inside the system, whereby parallel rays will be thrown onto the reflector.

The invention will be more fully described in the following, with reference to the accompanying drawings of two embodiments of the system. In the drawing FIG. 1 schematically and in large scale shows an embodiment of the present optical system in longitudinal section, FIG. 2 is an end view in smaller scale which shows a housing therefor, and FIG. 3 which is in same scale as FIG. 1, shows a schematical representation of the optical system in another embodiment of the invention.

Figure 2:
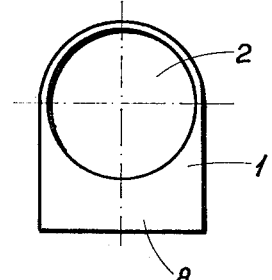

As shown in FIGS. 1 and 2 the system is enclosed in a housing 1 conveniently having the cross-section shown in FIG. 2 and provided with a cylindrical bore 2 the diameter of which is adjusted to the optical members of the system. In the housing two concave mirrors 3 and 4 are mounted in such manner that their optical axes 5 are coincident with the axis of the bore 2. The two concave mirrors may have different diameters and/or focal distances, but preferably they are identical in these respects and so constructed that the radii of all of their surfaces are identical, which facilitates their manufacture and mounting in the housing. The foremost concave mirror 3 is semi-aluminized as indicated so that its rear side is drawn with broken lines, whereas the rearmost concave mirror 4 (only shown in the drawing as its reflecting surface) is fully aluminized, i.e. in so far as possible totally reflecting. The semi-aluminization may be carried out in any known manner, for instance by making the reflecting layer very thin or by making it reticular or striated, i.e. as stripes or strips of reflecting material alternating with stripes with no aluminizing, or in any other convenient way. It should also be mentioned that although reference is made herein to "aluminized" or "silvered" mirrors, the invention should not be construed as limited to these two forms of making the mirrors reflecting, since any known material for this purpose may readily be employed. Also, the degree of aluminization may differ from 50 percent, but in any event the aluminization of the foremost concave mirror 3 is partial in so far as to reflect some light and allow some to pass therethrough. In front of the concave mirror 3 an incandescent lamp 6, expediently having a power of 1.5 watt, is mounted on a holder 7 fixed in the bottom part 8 of the housing. In the embodiment shown the lamp 6 is mounted so that its filament 9 is placed in the focal point of the concave mirror 3, whereby the part of the light from this lamp reflected by the concave mirror 3 is reflected as a beam of parallel rays. The filament may also be placed at a little longer distance from the mirror so as to cause the rays to converge somewhat though some loss of light is thereby caused.

Rays 10, 11 emitted from the filament will hit concave mirror 3. As the latter is semi-aluminized, half part 10 of the rays will pass through the mirror and be absorbed in the space behind, whereas the other half part 11 will be reflected forward, out of the housing. At some distance from this a reflector (not shown) is placed. It may be, for example, of the pearl screen or prism-screen type or a flat mirror. The reflector reflects the light along the same paths as the incident light, and some of the reflected rays, in the drawing schematically shown as a ray 12, will pass through the semi-aluminized concave mirror 3 into the space behind it.

Here, they hit the fully aluminized concave mirror 4 and when they enter parallel to the axis, as is preferred, they are reflected from the mirror and focused in the focal point of the concave mirror 4. In front of the concave mirror 4 a photoelectric cell 13 is placed so as to have its sensitive part 14 just at the focal point of the concave mirror 4. The function of the photoelectric cell is well-known and shall not be described. The photoelectric cell 4 is mounted in the housing on a holder 15 fixed in the bottom part 8 of the housing. Since commercially available photoelectric cells may have their sensitive parts placed rather varying relative to their surfaces, the holder 15 is conveniently mounted so as to be longitudinally adjustable in the bottom part 8 of the housing, a recess 16 being provided for this purpose in the said bottom part. When mounting the system and particularly the photoelectric cell, one switches the lamp 6 on and manipulates the holder forwards and backwards in the recess 16 by aid of an adjusting mechanism (not shown) until the sensitivity is maximal under the given conditions; when this is achieved, the photoelectric cell is correctly adjusted. In mounting the lamp 6 it is not necessary to take similar precautions with respect to a possibly slightly displaced mounting of the filament in the axial direction.

In the front end of the housing it is usually necessary to mount a curved cover glass 17. As in the embodiment shown, this may be optically neutral, but it may also be a convex lens focusing the beam of rays 11 in such a manner that a sharp image is formed at exactly or approximately the distance from the system at which to place the reflector. When the latter is of the prism screen type, the reflected light will diverge in the same manner as the convergence of the incident light and the reflected rays 12 are therefore again parallel behind the cover glass 17. It should be noticed that the term "cover glass" is used for convenience; the cover need not be made of glass but of any convenient transparent material such as transparent plastics.

The housing, which may be made of metal or of plastics, especially thermosetting plastics, has a rear wall 18 solid with the rest of the housing or made as a separate element fixed thereto. When mounting the housing the concave mirrors and the cover glass are placed and kept in place by aid of a rear ring 19, two distance rings 20 and 21 and a front holding ring 22. The latter may expediently be provided with a screw thread and adapted to be screwed into the cylindrical bore of the housing, whereas the other rings may be screwed or simply inserted and kept in place by rear wall 18 and holding ring 22.

If the system should be used for very demanding purposes, the foremost, semi-aluminized concave mirror 3 may be provided with a central blocking area 23 which may be light-absorbing or totally reflecting, whereby light will not penetrate direct from the incandescent lamp onto the photelectric cell. If it is desired to render the system more compact than the embodiment shown on FIG. 1, the two concave mirrors may be placed in closer proximity to each other. In that case, the photoelectric cell is placed in front of the foremost, semi-aluminized concave mirror and an opening provided in that mirror or at least in its reflecting layer, so that rays reflected from the totally aluminized, rearmost concave mirror may reach the photoelectric cell.

If it is desired to construct the system in such manner that the light-source is not directly visible from the front end, the position of the photoelectric cell and the incandescent lamp may be exchanged so as to place the photoelectric cell at the focal point of the foremost, semi-aluminized concave mirror 3 and the incandescent lamp in the focal point of the rearmost, fully aluminized concave mirror 4. In that case, the central part of the semi-aluminized concave mirror should be masked or blocked.

Figure 3:
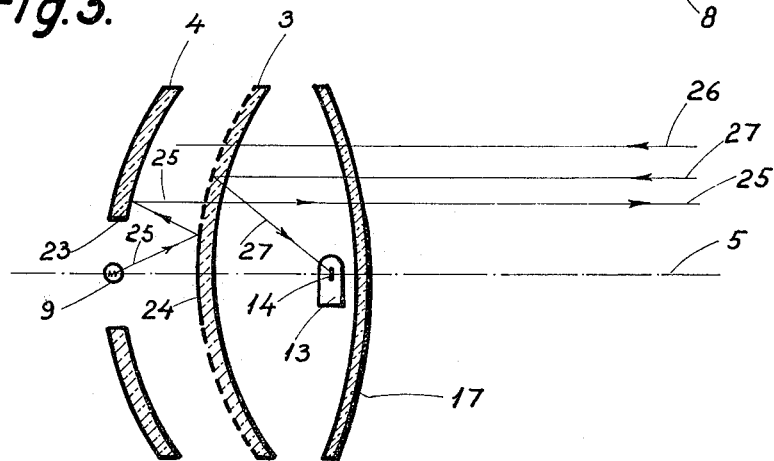

If it is desired to obtain a particularly compact system in which the lamp is not directly visible from the outside, it may be constructed as schematically indicated in FIG. 3. Also here a semi-aluminized concave mirror 3 is provided, and behind it a fully aluminized concave mirror with the same optical axis 5. In an opening 23 in the rearmost concave mirror 4 an incandescent lamp is mounted; only its filament 9 is shown. On the rear side of the central part of the concave mirror 3 a mirror 24 is provided which is substantially totally rearwardly reflecting. If the mirror 24 is a flat one, its distance from the filament is half of the focal distance of the concave mirror 4; the distance between the mirror 24 and the filament 9 is corrected if mirror 24 is a concave or convex spherical or otherwise curved mirror, the said distance being adjusted to half the equivalent focal distance of mirror 4. In this way, the filament 9 is functionally situated at the focal point of the concave mirror 4. At the focal point of the concave mirror 3 the sensitive part 14 of the photoelectric cell 13 is placed, and foremost a cover glass 17 is mounted which if desired may be a convex lens. The rays 25 emitted from the filament are reflected by the mirror 24 onto the concave mirror 4 and from there they are reflected parallel to the axis 5, half of them passing the semi-aluminized concave mirror 3. They are again reflected from the reflector (not shown), and the rays 26, 27 coming therefrom partly pass through the mirror 3 and partly are reflected onto the photoelectric cell 13. Even in this embodiment it is possible to exchange the positions of the photoelectric cell and the incandescent lamp.

What I claim is:

1. An optical system for photoelectirc control and detector equipment, adapted to convey a beam of light onto a reflector and receive the beam returned from the said reflector, said reflector returning the rays of the beam substantially via the paths along which they travel onto the reflector, said optical system comprising a light source, a photoelectric cell and a foremost and a rearmost concave mirror, said mirrors being identically oriented and having a common optical axis, said foremost mirror being the closer to said reflector, a straight line through the light-sensitive part of the photoelectric cell and the light-emitting element of the light source coinciding with said optical axis, the rearmost of the concave mirrors being substantially fully reflective and the foremost allowing a portion of the light to pass, wherein the improvement is that the foremost of the said concave mirrors is partially but uniformly aluminized.

2. An optical system as claimed in claim 1, in which the light-emitting element of the light-source is placed substantially at the focal point of the partially aluminized mirror and the sensitive part of the photoelectric cell is placed substantially at the focal point of said rearmost concave mirror, said focal point and said photoelectric cell being situated between said two mirrors.

3. An optical system as claimed in claim 2, in which a central part of the partially aluminized concave mirror is provided with a mask consisting of a material not permitting the passage of light.

4. An optical system as claimed in claim 1, in which the filament of an incandescent lamp constituting the light-source is placed in front of said partially aluminized mirror at a point on its optical axis between the focal point and the double focal distance thereof, the light-sensitive part of the photoelectric cell being placed at the focal point of the rearmost fully aluminized concave mirror.

5. An optical system as claimed in claim 4, in which a central part of the partially aluminized mirror is provided with a mask consisting of material not permitting the passage of light.

6. An optical system as claimed in claim 1, in which said light-source is an incandescent lamp mounted in a central opening in the rearmost concave mirror, further comprising a backwards reflecting, substantailly totally reflecting mirror placed on the central part of the rear side of the foremost partially aluminized concave mirror, the distance from the filament of the incandescent lamp to said rearmost reflecting mirror being effectively half the focal distance of the said rearmost concave mirror, the light-sensitive part of the photelectric cell being placed substantially in the focal point of the partially aluminized concave mirror.

7. An optical system as claimed in claim 1, in which the filament of an incandescent lamp constituting the light-source is placed substantially in the focal point of the partially concave aluminized mirror, the photoelectric cell being placed in a central opening in the rearmost concave mirror, a backwards substantially totally reflecting mirror being placed on the rear side of the partially aluminized concave mirror in such manner that the sensitive part of the photoelectric cell is situated in the functional focal point of the rearmost concave mirror.

8. An optical system as claimed in claim 1, in which the two concave mirrors have identical diameter for their periphery and identical radii for all of the curved surfaces.

9. An optical system as claimed in claim 1, in which the partially aluminized mirror is semi-aluminized.

10. An optical system as claimed in claim 1, wherein the mirrors, the light-source and the photoelectric cell are mounted in a housing containing a cylindrical bore in which the said members are placed, a convex lens being placed as front cover in the front end of the cylindrical bore, said convex lens being adapted to converge rays emitted from the light-source and reflected in a direction parallel to the axis by the respective concave mirror in a manner so as to focus said rays at a point near the reflector belonging to the system and adapted to reflect the incident light back to the photoelectric cell in said system.

References Cited
UNITED STATES PATENTS

| | | | |
|---|---|---|---|
| 2,490,052 | 12/1949 | Harris | 350—294 X |
| 2,953,059 | 9/1960 | Rodman et al. | |
| 3,020,792 | 2/1962 | Kingsbury | 350—294 X |
| 3,053,134 | 9/1962 | Bjornson | |

RALPH G. NILSON, Primary Examiner

MARTIN ABRAMSON, Assistant Examiner

U.S. Cl. X.R.

250—221; 350—294